United States Patent
Dopp et al.

(10) Patent No.: US 7,713,043 B2
(45) Date of Patent: May 11, 2010

(54) APPARATUS FOR UNIFORM FEEDING OF POWDERS

(75) Inventors: Robert Brian Dopp, Marietta, GA (US); Allan Nettleton, Madison, WI (US)

(73) Assignee: Quantumsphere, Inc., Santa Ana, CA (US)

( * ) Notice: Subject to any disclaimer, the term of this patent is extended or adjusted under 35 U.S.C. 154(b) by 1146 days.

(21) Appl. No.: 11/254,627

(22) Filed: Oct. 20, 2005

(65) Prior Publication Data

US 2007/0092593 A1    Apr. 26, 2007

(51) Int. Cl.
*B22F 3/18* (2006.01)
(52) U.S. Cl. .................. 425/79; 425/147; 425/363; 425/449; 222/56; 222/414
(58) Field of Classification Search .................. 425/79, 425/147, 363, 447, 449; 222/56, 414
See application file for complete search history.

(56) References Cited

U.S. PATENT DOCUMENTS

| | | | | |
|---|---|---|---|---|
| 1,585,413 A | * | 5/1926 | Price | 209/257 |
| 2,681,637 A | * | 6/1954 | Simpson | 118/308 |
| 3,145,430 A | * | 8/1964 | Caron | 425/83.1 |
| 3,321,079 A | * | 5/1967 | Sackett, Sr. | 209/38 |
| 3,399,839 A | * | 9/1968 | Anderson et al. | 241/11 |
| 3,456,357 A | * | 7/1969 | Griffith | 34/401 |
| T0,880,009 I4 | * | 11/1970 | Harris | 222/56 |
| 3,667,665 A | * | 6/1972 | Spencer | 222/412 |
| 3,934,475 A | * | 1/1976 | Rodgers et al. | 73/304 C |
| 4,349,323 A | * | 9/1982 | Furbish et al. | 425/147 |
| 5,419,071 A | * | 5/1995 | Fatica | 42/90 |

* cited by examiner

*Primary Examiner*—Robert B Davis
(74) *Attorney, Agent, or Firm*—Knobbe Martens Olson & Bear, LLP

(57) ABSTRACT

An apparatus for and a method of feeding powders to a subsequent processing step. In particular, the apparatus includes a first hopper, a first metering brush feed, an intermediate chamber, a second distribution brush, a level sensor, and a supply hopper to deliver powder to a pair of rollers. In one embodiment, the hopper is fitted to the roller diameter to produce a uniform, ribbon or free-standing sheets suitable for air-breathing battery and fuel cell electrodes.

15 Claims, 3 Drawing Sheets

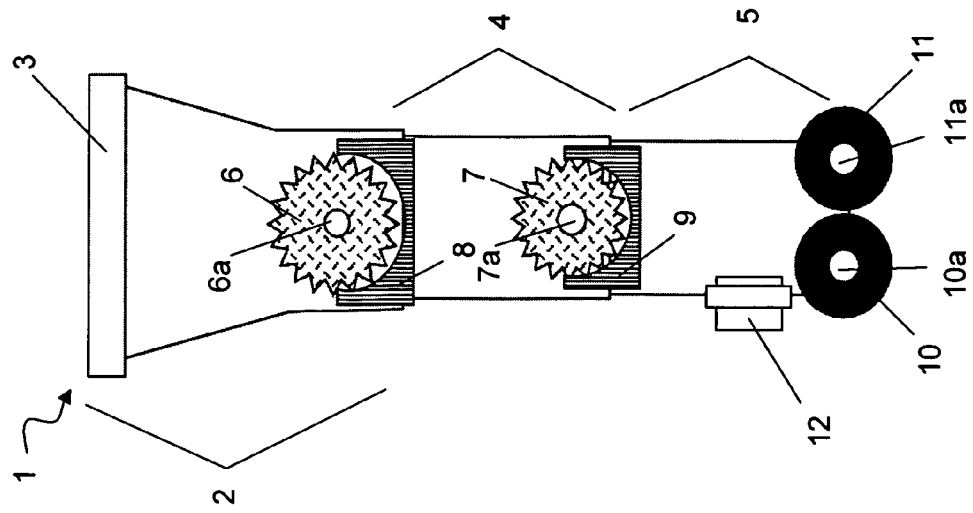
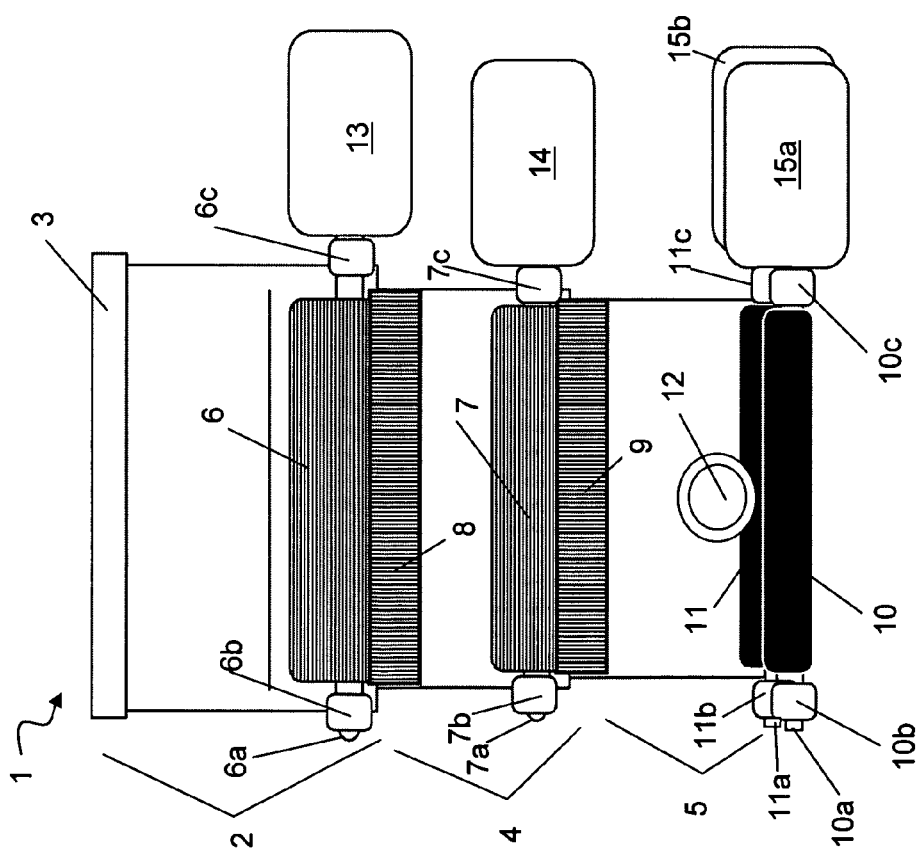
Fig. 1a
Fig. 1b

APPARATUS FOR UNIFORM FEEDING OF POWDERS

TECHNICAL FIELD

This invention relates to the art of feeding powders in general, and more particularly to an apparatus for feeding a powder mixture in a substantially uniform fashion to a subsequent processing step.

BACKGROUND ART

The use of roller mills to manufacture compressed, ribbons and free-standing sheets of material is well known in the field. (As used herein, "compressed" means self-adhering and shape-maintaining, but not necessarily without voids.) Most processes are plagued by uniformity difficulties often originating in the distribution technique used prior to compression.

Rolling mills have produced continuous sheets since antiquity. The feed of the raw material can be very important for the dimensional and compositional uniformity of the sheet. When the incoming stock is a solid sheet, such as gold for example, the uniformity is extremely high, resulting in an ability to compress the sheet to only a few tens of micrometers. When the feed stock is a powdered material, output uniformity is a more difficult challenge than with flat feedstock. Powders of mixed materials of differing sizes, hardness and shapes make the problem of metering even more challenging. Differing electro-static characteristics exacerbate the challenge even further. Generally, such powders are not free-flowing and thereby are difficult to meter uniformly for delivery of a processing step.

SUMMARY OF THE INVENTION

An embodiment of the invention is feeding apparatus to better apply a uniform layer of powder to the nip of a pair of rollers. The shape of the described apparatus and the interaction of the two feeder brushes promotes the even distribution and composition of the powder to the rollers so that the rollers produce a more dimensionally and compositionally uniform sheet. Optionally, a capacitive, and a controller based on a circuit which uses a timer to control the powder height above the final rolling nip for automatic operation.

In one embodiment, a powder feeding apparatus comprises: a housing comprising first and second open ends, and having first and second pairs of substantially opposing walls; a feeder hopper formed at the first open end of the housing, having first and second open ends, the second open end of which is coupled to a first open end of an intermediate chamber, having first and second open ends, that is formed in the housing adjacent to the feeder hopper; a first perforated cradle positioned between the feeder hopper and the intermediate chamber; a metering brush disposed in the feeder hopper proximate to, and having an axis roughly parallel to, the first perforated cradle; a distribution hopper formed at the second end of the housing, having first and second open ends, the first open end of which is coupled to the second open end of the intermediate chamber; a second perforated cradle positioned between the intermediate chamber and the distribution hopper; and a distribution brush disposed in the intermediate chamber proximate to, and having an axis roughly parallel to, the second perforated cradle.

A further embodiment of the powder feeding apparatus further comprises a material sensor disposed in the distribution hopper. In some embodiments, the material sensor is a capacitive sensor. In some embodiments the material sensor is operatively coupled to a control circuit to control a rotation of the metering brush. In further embodiments, the control circuit conditions an electrical signal from the material sensor through a timing circuit. In still further embodiments, the material sensor is not in physical contact with a material being sensed.

In some embodiments, the metering brush can have bristles comprising one of the class of bristles consisting of (i) polymer fibers; (ii) natural fibers; (iii) metallic fibers; and/or (iv) blends of polymer fibers, natural fibers, and metallic fibers.

In some embodiments, the distribution brush can have bristles comprising one of the class of bristles consisting of (i) polymer fibers; (ii) natural fibers; (iii) metallic fibers; and/or (iv) blends of polymer fibers, natural fibers, and metallic fibers.

In some embodiments, the first perforated cradle can comprise one of the class of perforated cradles consisting of (i) solid cradles with perforations formed therein, and (i) cradles made from a mesh. In some embodiments, the first perforated cradle can comprise one of a class of materials consisting of (i) metals; (ii) metal alloys; and (iii) organic polymers.

In some embodiments the second perforated cradle can comprise one of the class of perforated cradles consisting of (i) solid cradles with perforations formed therein, and (i) cradles made from a mesh. In some embodiments, the second perforated cradle can comprise one of a class of materials consisting of (i) metals; (ii) metal alloys; and (iii) organic polymers.

In some embodiments, the housing can comprise one of (i) polycarbonate, and (ii) polymethylmethacrylate.

Some embodiments further comprise first and second counter-rotatable milling rollers at the second open end of the housing, and in further embodiments, the first and second counter-rotatable milling rollers have axes that are roughly parallel to and coextensive with the axis of the distribution brush.

Other embodiments include a method for feeding powders, comprising: supplying a material mix to a feeder hopper; transferring the material mix from the feeder hopper to an intermediate chamber by the rotation of a metering brush proximate to a first perforated cradle; and transferring the material mix from the intermediate chamber to a distribution hopper by the rotation of a distribution brush proximate to a second perforated cradle.

Other embodiments of the method for feeding powders, can further comprise transferring the material mix from the distribution hopper to a roller mill.

For some embodiments of the invention, material mix is a gas diffusion cathode mix, and the roller mill exudes a ribbon of gas diffusion cathode material. In further embodiments, the exuded ribbon of gas diffusion cathode material is combined with a ribbon of current collection material for subsequent lamination.

BRIEF DESCRIPTION OF THE DRAWINGS

FIG. 1a illustrates a frontal view of an embodiment of the invention.

FIG. 1b illustrates a side view of the embodiment of FIG. 1.

FIG. 2a illustrates a frontal view of an operation of the embodiment of the invention as shown in FIG. 1a.

DETAILED DESCRIPTION OF THE INVENTION

Figure 2B:
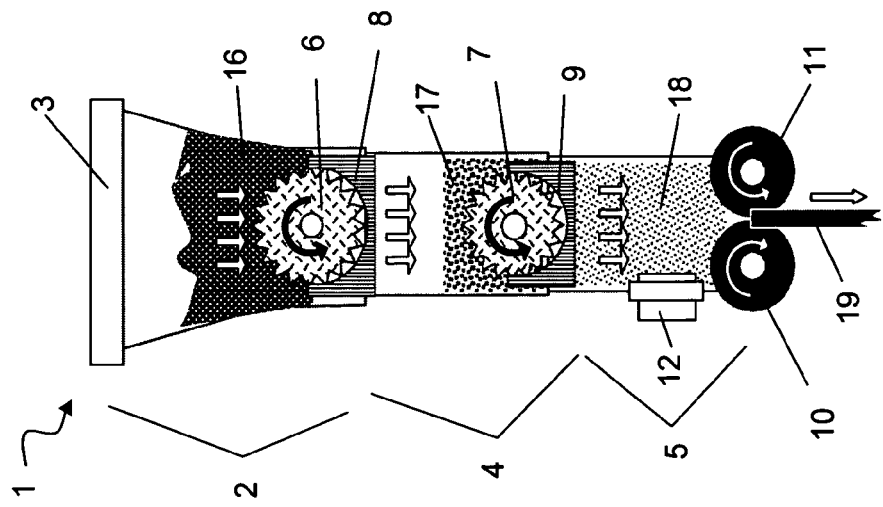
FIG. 2b illustrates a side view of an operation of the embodiment of the invention as shown in FIG. 1b.

Embodiments of this powder feeder invention provide for the improved delivery of powdered materials in general, and particularly the delivery of powder materials for the manufacture of components intended for use in gas diffusion electrodes for fuel cell systems and air breathing primary cells and batteries. Additionally many other applications requiring the uniform delivery of powdered materials can also benefit from the use embodiments of this invention.

FIGS. 1a and 1b present front and side views of an embodiment of the powder feeder 1. The housing of powder feeder 1 can be constructed of a transparent polymer material such as polycarbonate (for example, Lexan®, a registered trademark of the General Electric Corporation) or polymethylmethacrylate (for example Lucite®, a registered trademark of the Dupont Chemical Corporation). The use of a transparent polymer allows the visual monitoring of the operation of the device during operation. If a polycarbonate material is used, typical wall thicknesses for the assembly are about 25 mm. Other materials may be used that have adequate mechanical strength, and material chemistry compatibility with substances to be processed, as is well known to one of ordinary skill in the art.

Referring again to FIGS. 1a and 1b, feeder hopper 2 is disposed at the top of the apparatus. Unless being filled with material, feeder hopper 2 is typically covered with cover 3, which can be made of the same material as the housing of the powder feeder 1, but not necessarily. Metering brush 6 is disposed above a first perforated (or mesh) cradle 8 at the bottom of feeder hopper 2. The bristles of metering brush 6 can be made of polymer materials such as dense nylon, natural bristles such as pig bristles, metallic bristles, or combinations of the above.

The first perforated (or mesh) cradle 8 can be made of a material such as stainless steel, or other metal alloys, polymers, or fabrics. Preferably, articulate material typically does not pass through the first perforated (or mesh) cradle unless driven by a rotation of metering brush 6. In one embodiment metering brush 6 is mounted on horizontally positioned axel 6a, through bearings 6b and 6c that are mounted to opposing walls of feeder hopper 2, and controllably rotated by motor 13. Bearings 6b and 6c, can, for example, be Nettleton bearings. The dimension of the rectangular cross-section of the feeder hopper that is parallel to the axel of metering brush 6 is typically coextensive with the axial length of metering brush 6, and is larger than the orthogonal rectangular dimension, which can be selected to roughly match the diameter of metering brush 6.

Intermediate chamber 4 is defined by the housing and situated below the perforated (or mesh) cradle 8. The rotation of metering brush 6 can drive particles through the first perforated (or mesh) cradle 8 into intermediate chamber 4.

Situated at the bottom of intermediate chamber 4 is distribution brush 7, situated above a second perforated (or mesh) cradle 9. Distribution brush 7 is mounted on horizontally positioned axel 7a, through bearings 7b and 7c that are mounted to opposing walls of feeder hopper 2, and rotated by motor 14. Bearings 7b and 7c, can, for example, be Nettleton bearings. The bristles of distribution brush 7 can be made of polymer materials such as dense nylon, natural bristles such as pig bristles, metallic bristles, or combinations of the above.

In one embodiment, particles will not pass through the second perforated (or mesh) cradle 9, unless driven by a rotation of distribution brush 7. Preferably the axel 7a of distribution brush 7 is parallel with the axel 6a of metering brush 6. Also, in one embodiment the axial length of distribution brush 7 is roughly the same as the axial length of metering brush 6. In one embodiment, the dimension of the rectangular cross-section of the intermediate chamber that is parallel to the axel of distribution brush 7 is roughly coextensive with the axial length of metering brush 7, and is larger than the orthogonal rectangular dimension, which can be selected to roughly match the diameter of metering brush 7. Typically distribution brush 7 rotates at a constant rate and feeds particles through the second perforated (or mesh) cradle 9, as long as particles are supplied to intermediate chamber 4. Although the particles in intermediate chamber 4 may be agitated by the rotation of distribution brush 7, they typically do not pass through the first perforated (or mesh) cradle 8 and back into feeder hopper 2. This can allow for the vigorous agitation of particles by distribution brush 7 for uniform application to a subsequent processing step, without substantially agitating the material in the feeder hopper 2.

Particles forced through the second perforated (or mesh) cradle 9 can enter the distribution hopper 5 that is situated below and connected with the second perforated (or mesh) cradle 9. Distribution hopper 5 is provisioned with a sensor 12 that can sense material levels or densities within distribution hopper 5. As discussed below, these material levels or densities can be used to automatically control the rotation of metering brush 6.

In some embodiments, a rolling mill comprised of counter-rotating rollers 10 and 11 can be positioned at the bottom of distribution hopper 5, to receive material provided by distribution hopper 5. Typically the axels 10a and 10b of mill rollers 10 and 11, respectively, are parallel with the axel 7a of distribution brush 7. Also, the axial lengths of rollers 10 and 11 are roughly the same as the axial length of distribution brush 7. Typically, the dimension of the rectangular cross-section of the intermediate chamber that is parallel to the axels of rollers 10 and 11 are roughly identical and roughly coextensive with the axial length of distribution brush 7, and are larger than the orthogonal rectangular dimension, which can be selected to roughly match the diameter of metering brush 7. Rollers 10 and 11 can be driven in counter rotation by motors 15a and 15b, or by a single motor 15 (not shown) with an appropriate gear, or other, mechanical transmission train. Typically, the combined diameters of rollers 10 and 12, plus the nip gap in between, is roughly equivalent to the distance of the opposing distribution hopper 5 walls that are parallel to the axels for rollers 10 and 12.

Figure 2A:
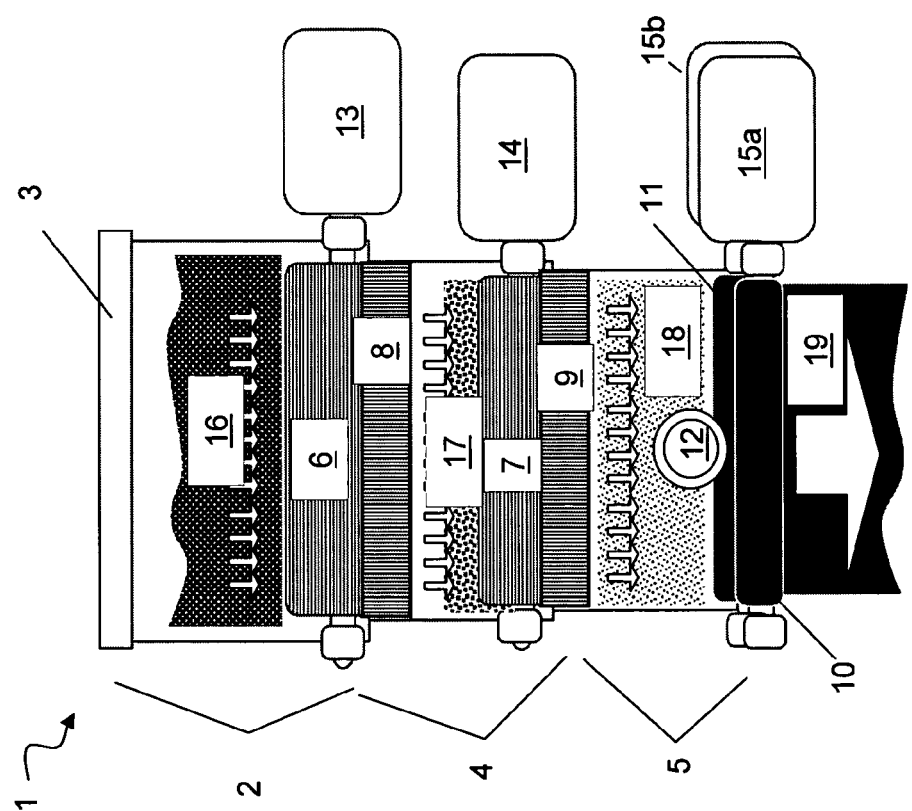

FIGS. 2a and 2b illustrate the operation of powder feeder 1 according to an embodiment of the invention, in front and side views, respectively. Material 16, prepared for example as described below in Example 1, is loaded into feeder hopper 2. Metering brush 6, is controllable rotated by motor 13, under manual control, or responsive to signals from level or density sensor 12. In this manner, metering brush 6 can control the rate at which material 17 is fed into intermediate chamber 4 from the feeder hopper through the first perforated (or mesh) cradle 7. Material 17 in intermediate chamber 4 can then be agitated and fed through the second perforated (or mesh) cradle 9 by distribution brush 7, which typically rotates at a constant rate for uniform feeding of the material to distribution hopper 5. Sensor 12 can sense a material level and/or density in the distribution hopper 5. In some embodiments an output from sensor 12 is processed through an electronic circuit to control the operation of motor 13 that actuates metering brush 6. Sensor 12 can be of a capacitive, photoelectric, conductive, ultrasonic, microwave, pressure, or temperature type, as is well known to one of ordinary skill in the art. In particular, for use in conjunction with a carbon based material to be processed, a capacitive sensor can be advantageously used.

As an example of a subsequent processing step that uses material 18 from supply hopper a rolling mill comprising rollers 10 and 11 is shown positioned at the bottom of supply hopper 5, from which a compressed ribbon of material 19 emerges. This embodiment can operate in a continuous production mode, producing continues lengths of the compressed ribbon of material 19, as long as the feeder hopper 2 is supplied with material 16.

Embodiments of the powder feeding apparatus use separate metering and distribution brushes as described above to enhance the uniformity of the powder supplied to the nip of the rollers, without substantially agitating material in the feeder hopper. Embodiments using a capacitive sensor provide the ability to change the carbon pile depth through an adjustment in a circuit rather than through a physical adjustment of a sensor. This powder is applied uniformly to roller nips to form a free-standing sheet. The Teflon within the mixture fibrillates during milling to form a free-standing sheet. This sheet can be used to construct alkaline fuel cell electrodes by pressure lamination into a nickel current collector, or into proton exchange membrane fuel cell (PEMFC) electrodes, direct methanol fuel cell (DMFC) electrodes, and air battery electrodes through other physical processes that are well known to one of ordinary skill in the art.

Figure 3:
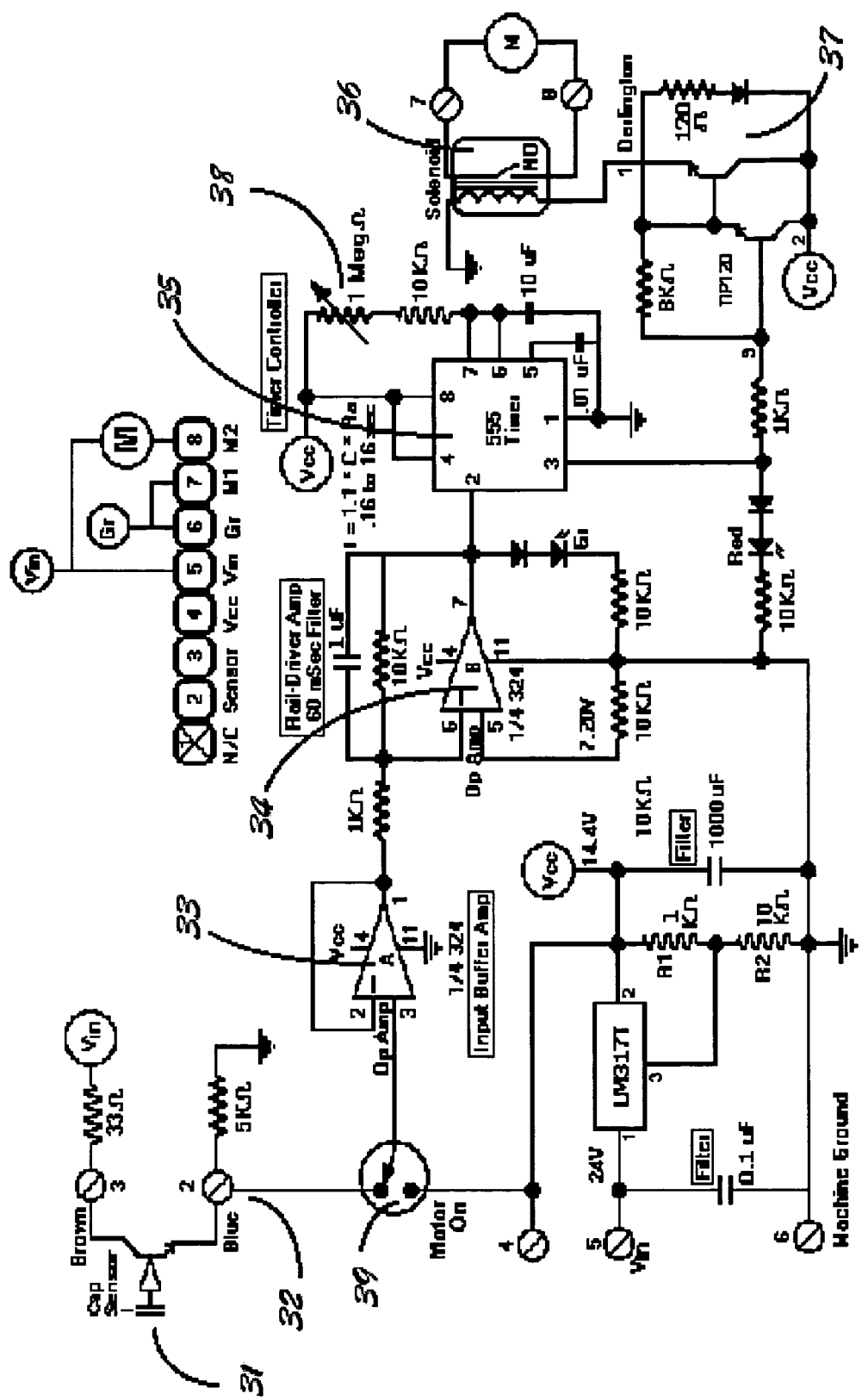
FIG. 3 is a schematic diagram of a controller according to an embodiment of the invention.

Referring to FIG. 3: When the carbon is not sensed by the capacitive sensor (31), the input (32) is driven positive. This signal is buffered by the gain one amplifier (33) and fed into the rail-to-rail driver (34) which triggers the timing circuit (35). The timing circuit activates the output solenoid (36) through a Darlington power transistor (37) which turns on the metering motor (9) rotating the metering brush (6). To allow more carbon in the final chamber (8), the variable resistor (38) is adjusted to give the desired time increment. An option for continuous feed can be achieved through switch (39) which holds amplifier (33) in the high position.

A gas electrode of the type produced by this invention, can comprise several key components, for example without exclusion: (i) activated carbon of about 90 μm average diameter; (ii) in situ reduced MnO from $KMnO_4$ adsorbed inside and on the surface of the carbon particles precipitated in situ within activated carbon; (iii) polytetrafluoroethylene (PTFE) particles (for example particles from Teflon-30b with a particle size of 50 to 500 nm); and (iv) other nano-meter sized powders from 2 to 30 nm in diameter added as dry powders. These components not only range in size by five orders of magnitude, but also differ greatly in electrical properties from good conductors to good insulators.

This invention relates to a novel way of distributing the powders in two independently driven feeding steps, each distributing the powder to the next. The height of the powder above the roller nips is uniformly controlled through a unique use of a capacitive sensor with a circuit which includes a timer so that adjustments to the height is accomplished without physically moving the sensor.

The following examples are offered to illustrate but not to limit the invention.

Example 1

Exemplary Preparation of a Gas Diffusion Cathode Powder Mix for Use with Embodiments of the Current Invention Place about 500 g distilled water into a large beaker (at least 1.5 liters).

Slowly add 150 grams Darco G-60 (from American Norit) carbon powder or equivalent to distilled or deionized water, mixing slowly to dampen mixture.

Place a propeller type mixer into the vessel, establishing a stable vortex without drawing air into the fluid (i.e. vortex can not touch the mixing blade) and mix for about 20 minutes.

Slowly (about 30 seconds) add about 250 grams of 20% $KMnO_4$ solution to the mixture and stir for 30 minutes. The $KMnO_4$ is reduced to valence +2 manganese in situ by the activated carbon.

Very slowly (about 1 minute) add 25 cc PTFE suspension (DuPont grade 30-N).

Continue stirring for 30 minutes, taking care to maintain the vortex, but not allowing air to be driven into the fluid. The mixture initially becomes very viscous, then less so as the Teflon particles adhere to the carbon in the mixture.

Filter in a large Buchner funnel and transfer to a non-corrosive pan.

Dry in a preheated oven at 75 degrees C. for 24 hours in an open container.

Dry in a preheated oven at 120 degrees C. for 12 hours in an open container.

Place lid on drying pan and after cooling below 100 degrees C., place container in a sealed plastic bag.

After cooling is complete, add about 10% nano catalyst (QuantumSphere, Inc., Santa Ana, Calif.) depending on experimental design.

Dry blend in a very high sheer blender for at least 30 seconds up to 5 minutes.

The above exemplary material mix can be supplied to the feed hopper of an embodiment of the present invention, and a ribbon of gas diffusion cathode material can be exuded from a roller press at the distal end of the supply hopper of the embodiment. The exuded ribbon of gas diffusion cathode material can be continuous, and, in some embodiments, it can be combined with a ribbon of current collector material for subsequent lamination to form working cathodes.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A powder feeding apparatus comprising:

a housing comprising first and second open ends, and having first and second pairs of substantially opposing walls;

a feeder hopper formed at the first open end of the housing, having first and second open ends, the second open end of which is coupled to a first open end of an intermediate chamber, having first and second open ends, that is formed in the housing adjacent to the feeder hopper;

a first perforated cradle positioned between the feeder hopper and the intermediate chamber;

a metering brush disposed in the feeder hopper proximate to, and having an axis roughly parallel to, the first perforated cradle;

a distribution hopper formed at the second end of the housing, having first and second open ends, the first open end of which is coupled to the second open end of the intermediate chamber;

a second perforated cradle positioned between the intermediate chamber and the distribution hopper; and a distribution brush disposed in the intermediate chamber proximate to, and having an axis roughly parallel to, the second perforated cradle, wherein the distribution brush is configured to drive the powder through the second perforated cradle.

2. The apparatus of claim 1, further comprising a material sensor proximate to the distribution hopper.

3. The apparatus of claim 2, wherein the material sensor is a capacitive sensor.

4. The apparatus of claim 2, wherein the material sensor is not in physical contact with the material being sensed.

5. A powder feeding apparatus comprising:

a housing comprising first and second open ends, and having first and second pairs of substantially opposing walls;

a feeder hopper formed at the first open end of the housing, having first and second open ends, the second open end of which is coupled to a first open end of an intermediate chamber, having first and second open ends, that is formed in the housing adjacent to the feeder hopper;

a first perforated cradle positioned between the feeder hopper and the intermediate chamber;

a metering brush disposed in the feeder hopper proximate to, and having an axis roughly parallel to, the first perforated cradle;

a distribution hopper formed at the second end of the housing, having first and second open ends, the first open end of which is coupled to the second open end of the intermediate chamber;

a second perforated cradle positioned between the intermediate chamber and the distribution hopper; and a distribution brush disposed in the intermediate chamber proximate to, and having an axis roughly parallel to, the second perforated cradle, wherein the material sensor is operatively coupled to a control circuit to control a rotation of the metering brush.

6. The apparatus of claim 5, wherein the control circuit conditions an electrical signal from the material sensor through a timing circuit.

7. The apparatus of claim 1, wherein the metering brush has bristles comprising one or more materials selected from the group consisting of polymer fibers; natural fibers; and metallic fibers.

8. The apparatus of claim 1, wherein the distribution brush has bristles comprising one or more materials selected from the group consisting of polymer fibers; natural fibers; and metallic fibers.

9. The apparatus of claim 1, wherein the first perforated cradle comprises a solid cradle with perforations formed therein or a cradle made from a mesh.

10. The apparatus of claim 9, wherein the first perforated cradle comprises a material selected from the group consisting of metals; metal alloys; and organic polymers.

11. The apparatus of claim 1, wherein the second perforated cradle comprises a solid cradle with perforations formed therein or a cradle made from a mesh.

12. The apparatus of claim 11, wherein the second perforated cradle comprises a material selected from the group consisting of metals; metal alloys; and organic polymers.

13. The apparatus of claim 1, wherein the housing comprises polycarbonate or polymethylmethacrylate.

14. A powder feeding apparatus comprising:

a housing comprising first and second open ends, and having first and second pairs of substantially opposing walls;

a feeder hopper formed at the first open end of the housing, having first and second open ends, the second open end of which is coupled to a first open end of an intermediate chamber, having first and second open ends, that is formed in the housing adjacent to the feeder hopper;

a first perforated cradle positioned between the feeder hopper and the intermediate chamber;

a metering brush disposed in the feeder hopper proximate to, and having an axis roughly parallel to, the first perforated cradle;

a distribution hopper formed at the second end of the housing, having first and second open ends, the first open end of which is coupled to the second open end of the intermediate chamber;

a second perforated cradle positioned between the intermediate chamber and the distribution hopper;

a distribution brush disposed in the intermediate chamber proximate to, and having an axis roughly parallel to, the second perforated cradle; and first and second counter-rotatable milling rollers at the second open end of the housing.

15. The apparatus of claim 14, wherein the first and second counter-rotatable milling rollers have axes that are substantially parallel to and coextensive with the axis of the distribution brush.

* * * * *